(12) United States Patent
Kemeny

(10) Patent No.: US 9,399,370 B2
(45) Date of Patent: Jul. 26, 2016

(54) WHEEL ASSEMBLIES

(71) Applicant: Zoltan A. Kemeny, Tempe, AZ (US)

(72) Inventor: Zoltan A. Kemeny, Tempe, AZ (US)

( * ) Notice: Subject to any disclaimer, the term of this patent is extended or adjusted under 35 U.S.C. 154(b) by 66 days.

(21) Appl. No.: 14/499,460

(22) Filed: Sep. 29, 2014

(65) Prior Publication Data

US 2015/0090379 A1 Apr. 2, 2015

Related U.S. Application Data

(63) Continuation-in-part of application No. 13/507,392, filed on Jun. 25, 2012.

(60) Provisional application No. 61/960,964, filed on Oct. 2, 2013.

(51) Int. Cl.
*B60B 9/24* (2006.01)
*B60B 9/28* (2006.01)
*B60B 15/02* (2006.01)

(52) U.S. Cl.
CPC ... *B60B 9/24* (2013.01); *B60B 9/28* (2013.01); *B60B 15/023* (2013.01); *B60B 2900/551* (2013.01)

(58) Field of Classification Search
None
See application file for complete search history.

(56) References Cited

U.S. PATENT DOCUMENTS

| | | | |
|---|---|---|---|
| 955,440 A | 4/1910 | Salladay | |
| 985,039 A * | 2/1911 | Kimball | B60B 9/06 152/100 |
| 1,090,797 A | 3/1914 | Short | |
| 1,401,845 A * | 12/1921 | Wilcox | B60B 9/06 152/100 |
| 1,403,824 A | 1/1922 | Wiggins | |
| 1,436,840 A * | 11/1922 | Weirich | B60B 9/06 152/100 |
| 1,465,747 A * | 8/1923 | Vobach | B60B 9/26 152/102 |
| 1,546,722 A | 7/1925 | Einfeldt | |
| 1,549,827 A | 8/1925 | Gourley | |
| 1,587,679 A | 6/1926 | Richter et al. | |
| 1,979,935 A * | 11/1934 | Henap | B60B 9/28 152/55 |
| 3,672,458 A | 6/1972 | Mackerle | |
| 3,896,868 A | 7/1975 | Molitor | |
| 4,153,145 A | 5/1979 | Ellis et al. | |
| 6,041,838 A * | 3/2000 | Al-Sabah | B60B 9/28 152/55 |
| 6,698,480 B1 | 3/2004 | Cornellier | |
| 2009/0211675 A1 | 8/2009 | Louden | |
| 2013/0340902 A1* | 12/2013 | Kemeny | B60B 9/26 152/1 |
| 2014/0060715 A1 | 3/2014 | Winshtein et al. | |

FOREIGN PATENT DOCUMENTS

| | | |
|---|---|---|
| DE | 10121066 | 11/2002 |
| DE | 102005032442 | 1/2007 |
| FR | 351455 | 7/1905 |
| FR | 464426 | 3/1914 |
| FR | 642265 | 8/1928 |

(Continued)

*Primary Examiner* — John Walters
*Assistant Examiner* — Hilary L Johns
(74) *Attorney, Agent, or Firm* — Michael W. Goltry; Robert A. Parsons; Parsons & Goltry

(57) ABSTRACT

A wheel assembly includes a circular frame arranged about a hub of a hub assembly, and shock absorbers coupling the hub assembly to the circular frame for providing relative motion between the circular frame and the hub assembly. Each of the shock absorbers extends along a tangent line to a circle that is coaxial with respect to the circular frame and the hub for providing tangential shock absorption along each tangent line.

12 Claims, 18 Drawing Sheets

(56) References Cited

FOREIGN PATENT DOCUMENTS

| | | |
|---|---|---|
| GB | 12343 | 0/1909 |
| GB | 13066 A | 0/1912 |
| GB | 19162 | 0/1910 |
| GB | 259312 | 0/1926 |
| GB | 176158 A | 8/1922 |
| GB | 561374 | 5/1944 |

* cited by examiner

WHEEL ASSEMBLIES

CROSS-REFERENCE TO RELATED APPLICATIONS

This non-provisional U.S. patent application claims the benefit of U.S. provisional patent application Ser. No. 61/960, 964, filed Oct. 2, 2013, the entire contents of which are incorporated herein by reference, and is a continuation in part of U.S. non-provisional patent application Ser. No. 13/507, 392, filed Jun. 25, 2012, the entire contents of which are incorporated herein by reference.

FIELD OF THE INVENTION

The present invention relates to wheel assemblies for vehicles, including motorized and non-motorized vehicles.

BACKGROUND OF THE INVENTION

The first significant development in human locomotion from primitive modes of transportation, such as horses and camels, was the wheeled vehicle. The wheeled vehicle was one of the great inventions of all time because of the contribution that the wheel, and its utilization in a vehicle, makes to applying supplemental sources of power to human mobility. Horses and camels can travel faster than the humans riding on their backs, but to transport more than one person with a single animal, something most horses had the strength to do, a vehicle was needed. It is believed that the first conveyance of this sort was a plank or log dragged along the ground. Its mechanical inefficiency must have prompted the search for improvements. The invention of the wheel made the contribution of a horse more productive. The power provided by any one horse has varied little over time, but the effective product of that horsepower has grown with changes in vehicles, in harnessing, and in the surface on which it operates.

Since the rise of the automobile, the wheel, a circular frame that is solid, partly solid, or spoked, and that is capable of turning on an axle, has remained essentially unchanged, with the exception of wheel material advancements and the development of the tire, the ring-shaped vehicle component that covers the wheel's rim to protect it and enable better vehicle performance. With the exception of the tire, known wheels are inherently non-compliant. To reduce the effect of travelling over rough ground, leading to improved ride quality and vehicle handling, modern vehicles incorporate a system of springs, shock absorbers, and linkages that connect a vehicle to its wheels and allows relative motion between the two. Notwithstanding exemplary innovations in vehicle suspensions, wheels and tires are still often damaged from running over potholes and other obstacles. Moreover, vehicle suspensions are difficult to construct and expensive to maintain and replace. Given these and other deficiencies in the art, the need for certain new and useful improvements in the wheel is evident.

SUMMARY OF THE INVENTION

According to the principle of the invention, a wheel assembly includes a circular frame arranged about a hub of a hub assembly, and shock absorbers coupling the hub assembly to the circular frame for providing relative motion between the circular frame and the hub assembly. Each of the shock absorbers extends along a tangent line to a circle that is coaxial with respect to the circular frame and the hub for providing tangential shock absorption along each tangent line. Each of the shock absorbers is a piston-cylinder assembly. The hub assembly includes spokes radiating from the hub toward the circular frame, and the shock absorbers are coupled to the spokes of the hub assembly and to the circular frame coupling the hub assembly to the circular frame.

According to the principle of the invention, a wheel assembly includes a circular frame arranged about a hub of a hub assembly, and shock absorbers between the circular frame and the hub assembly. The shock absorbers are disposed circumferentially about the hub. Each of the shock absorbers has a first end pivotally connected to the hub assembly and a second end pivotally connected to the circular frame. Each of the shock absorbers extends along an axis from the first end to the second end and that is tangential to a circle that is coaxial with respect to the circular frame and the hub for providing tangential shock absorption along each axis. Each of the shock absorbers is a piston-cylinder assembly. The hub assembly includes spokes radiating from the hub toward the circular frame, and the first ends of the shock absorbers are pivotally connected to the spokes.

According to the principle of the invention, a wheel assembly includes a circular frame arranged about a hub of a hub assembly, and parallel sets of shock absorbers coupling the hub assembly to the circular frame for providing relative motion between the circular frame and the hub assembly. Each of the shock absorbers extends along a tangent line to a circle that is coaxial with respect to the circular frame and the hub for providing tangential shock absorption along each tangent line. Each of the shock absorbers is a piston-cylinder assembly. The hub assembly includes spokes radiating from the hub toward the circular frame, and the shock absorbers are coupled to the spokes of the hub assembly and to the circular frame coupling the hub assembly to the circular frame.

According to the principle of the invention, a wheel assembly includes a circular frame arranged about a hub of a hub assembly, and parallel sets of shock absorbers between the circular frame and the hub assembly. The shock absorbers of each one of the parallel sets of shock absorbers are disposed circumferentially about the hub. Each of the shock absorbers has a first end pivotally connected to the hub assembly and a second end pivotally connected to the circular frame. Each of the shock absorbers extends along an axis from the first end to the second end and that is tangential to a circle that is coaxial with respect to the circular frame and the hub for providing tangential shock absorption along each axis. Each of the shock absorbers is a piston-cylinder assembly. The hub assembly includes spokes radiating from the hub toward the circular frame, and the first ends of the shock absorbers are pivotally connected to the spokes.

BRIEF DESCRIPTION OF THE DRAWINGS

Referring to the drawings.

DETAILED DESCRIPTION

Figure 1:
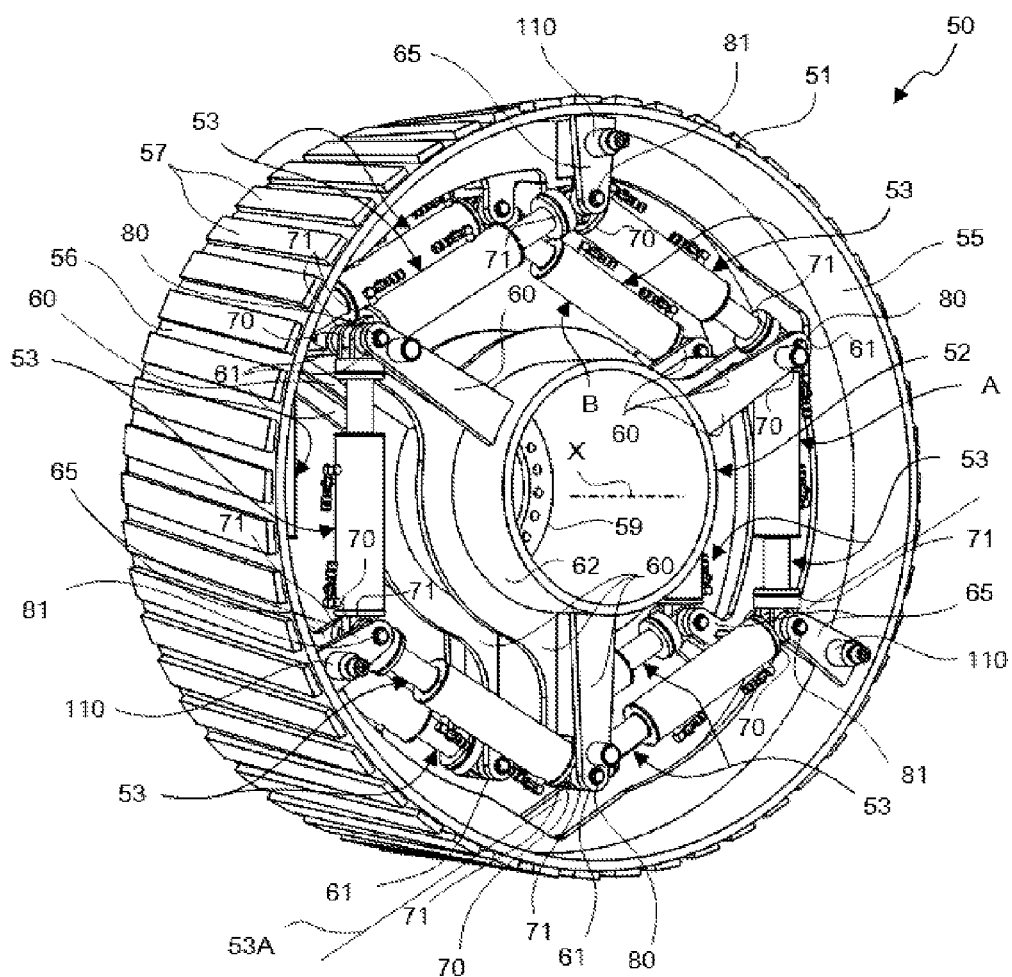
FIG. 1 is an inboard perspective view of a wheel assembly constructed and arranged in accordance with the principle of the invention, the wheel assembly includes a circular frame arranged about a hub, and shock absorbers coupling the hub to the circular frame for providing relative motion between the circular frame and the hub.
Figure 2:
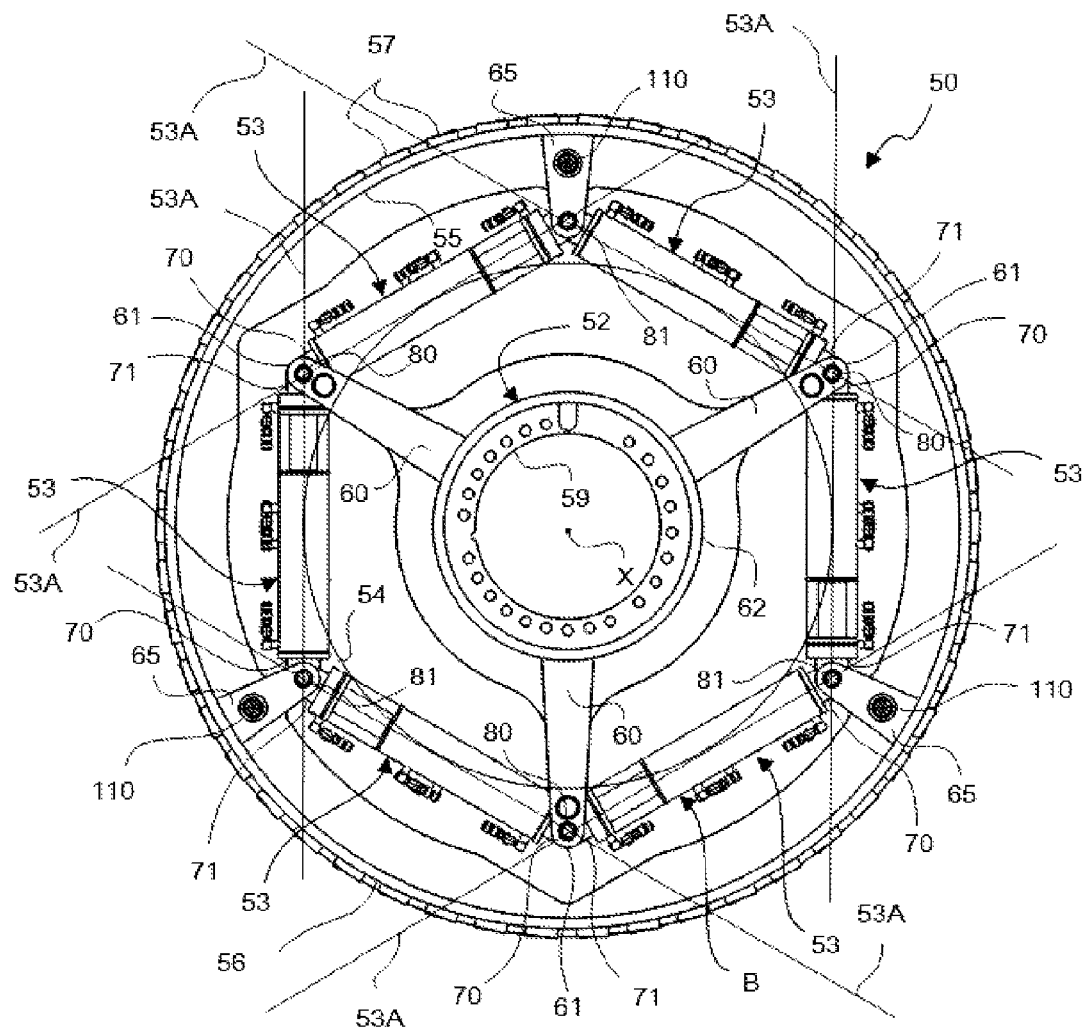
FIG. 2 is an outboard side elevation view of the embodiment of FIG. 1.

Turning now to the drawings, in which like reference characters indicate corresponding elements throughout the several views, attention is first directed to FIGS. 1 and 2 in which there is seen an inboard perspective view and an outboard side elevation view, respectively, of a wheel assembly 50 constructed and arranged in accordance with the principle of the invention. Wheel assembly 50 includes circular frame 51 arranged hub assembly 52 and hub 62 of hub assembly 52, and shock absorbers 53 coupling hub assembly 52 to circular frame 51 for providing relative motion/movement between circular frame 51 and hub assembly 52, including hub 62. Hub 62 is the center of hub assembly 52 and wheel assembly 50, and shock absorbers 53 are positioned between circular frame 51 and hub assembly 52, including hub 62, and circumscribe hub 62. Circular frame 51, hub 62 of hub assembly 52, and shock absorbers are coaxial and are arranged about axis X, which is the axis of rotation of wheel assembly 50. In FIG. 2, each of the shock absorbers 53 extends along a tangent line 53A to a circle denoted at 54 that is arranged about axis X and that is coaxial with respect to circular frame 51 and hub 62 for providing tangential shock absorption by shock absorbers 53 along each of the tangent lines 53A, which allows circular frame 51 to displace radially and circumferentially relative to hub 62 and hub assembly 52 in all directions. The circle denoted at 54 is between circular frame 51 and hub 62.

Circular frame 51 and hub assembly 52 are each fashioned of steel, steel alloy, aluminum, aluminum alloy, or other like or similar material or combination of materials having the inherent properties of rigidity, resilience, impact resistance, and strength. Circular frame 51 includes circular inner surface 55, and circular outer surface 56 formed with exterior tread 57. Exterior tread 57 is fashioned of hardened rubber, ceramic, steel, or other selected material or combination of materials. Tread 57 is rigidly affixed to circular outer surface 56, such as by adhesive, welding, heat bonding, or mechanical fasteners. In this example, exterior tread 57 consists of parallel tread strips. Other tread configurations can be used without departing from the invention. In an alternate embodiment, an inflatable or solid tire, having a selected tread, can be attached to circular frame 51. In these embodiments, wheel assembly 50 would be the support for the inflatable tire, or the solid tire.

Hub 62 is part of hub assembly 52 of wheel assembly 50. Shock absorbers 53 couple hub assembly 52 to circular frame 51 and, as such, couple hub 62 to circular frame 51. Hub assembly 52 is centered in the area that circular frame 51 surrounds. Hub assembly 52 includes a plurality of spokes 60 radiating outwardly from hub 62 toward circular inner surface 55 of circular frame 51. Spokes 60 are identical in every respect and are radially perpendicular relative to axis X of rotation of wheel assembly 50. In this example, there are three spoke sets of four axially spaced-apart spokes 60, the spoke sets being equally spaced-apart radially relative to each other. Hub assembly 52 is not directly attached to circular frame 51. Rather, shock absorbers 53 connect hub assembly 52, and thus hub 62, to circular frame 51, and shock absorbers 53 provide shock absorption between circular frame 51 and hub assembly 52, including hub 62. Spokes 60 each radiate from hub assembly 52 and terminate with outer end 61. Three equally spaced-apart lug sets of four axially-spaced apart lugs 65 radiate inwardly from circular inner surface 55 of circular rim 51. These lug sets are equally spaced-apart circumferentially along circular frame 51 relative to each other. There is one lug set equidistant between each adjacent pair of spoke sets. Since there are three spoke sets, there are three corresponding lug sets. To reinforce spokes 60, reinforcing plates or members can be affixed, such as by welding, between adjacent spokes 60 of each spoke set.

Shock absorbers 53 each have an inner end 70 and an opposed outer end 71. Each shock absorber 53 is arranged about, and extends along, an axis from inner end 70 to outer end 71. The axis from inner end 70 to outer end 71 is coincident with tangent line 53A. Accordingly, the tangent line and the axis from inner end 70 to outer end about which each shock absorber 53 is arranged are given the same reference numeral 53A. In FIG. 2, each of the shock absorbers 53 extends along axis/tangent line 53A that is tangent or otherwise tangential to circle 54 arranged about axis X and that is coaxial with respect to circular frame 51 and hub 62 for providing tangential shock absorption by shock absorbers 53 along each of the axes/tangent lines 53A, which, again, allows circular frame 51 to displace radially and circumferentially relative to hub 62 and hub assembly 52 in all directions.

Figure 5:
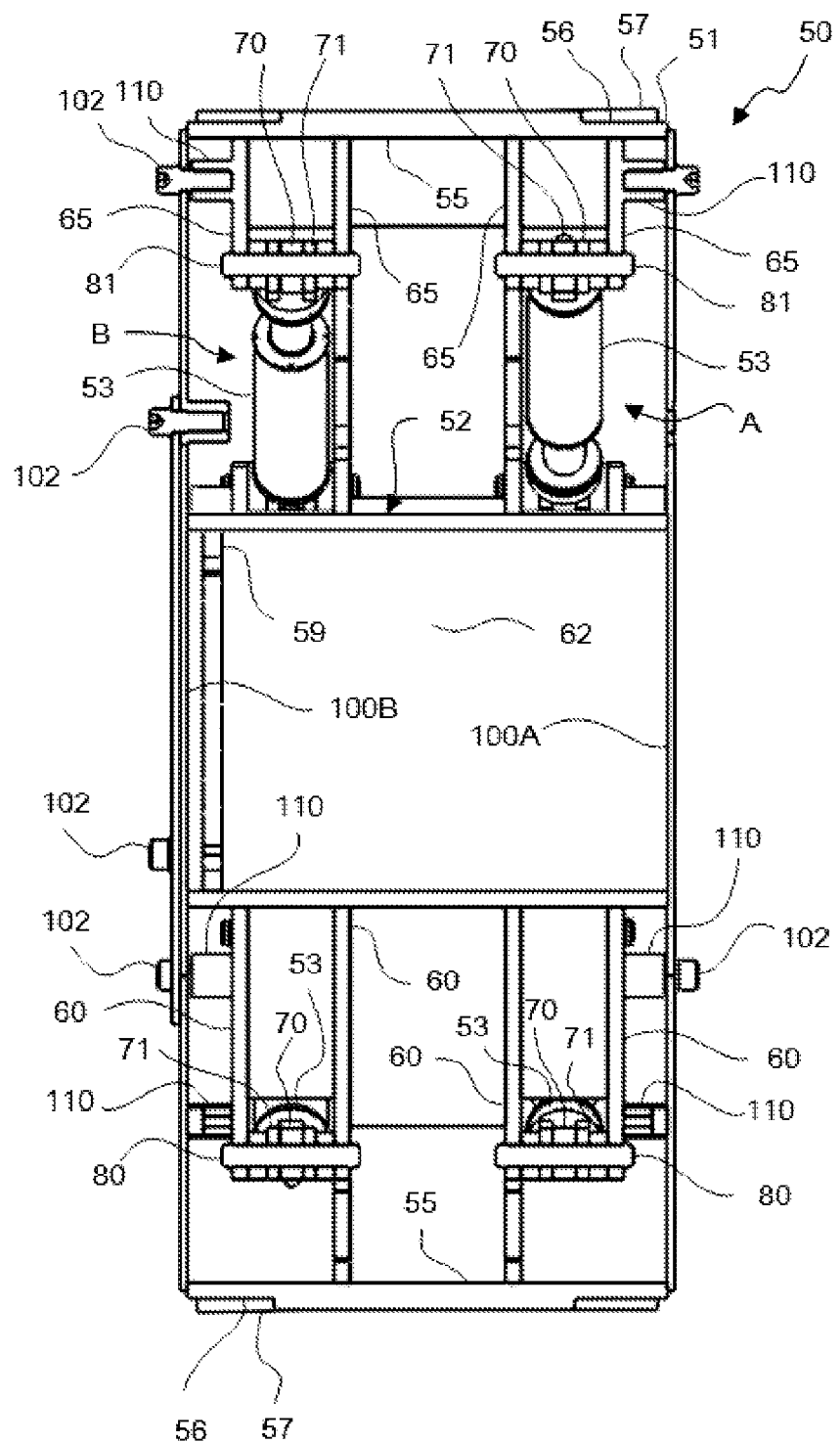
FIG. 5 is a section view taken along line 5-5 of FIG. 4.

There are two sets of shock absorbers 53 in wheel assembly 50, an inboard set A near the inboard side of wheel assembly 50 in FIGS. 1 and 5, and an outboard set B near the outboard side of wheel assembly 50 in FIGS. 2 and 5. The inboard and outboard sets A and B of shock absorbers 53 are disposed side-by-side and circumferentially about hub assembly 52, and circular frame 51 is circumscribed about the inboard and outboard sets A and B of shock absorbers 53. FIG. 2 illustrates each of the shock absorbers 53 of outboard set B extending along axis/tangent line 53A that is tangent or otherwise tangential to circle 54 arranged about axis X and that is coaxial with respect to circular frame 51 and hub 62 for providing tangential shock absorption by shock absorbers 53 of outboard set B along each of the axes/tangent lines 53A, which, again, allows circular frame 51 to displace radially and circumferentially relative to hub 62 and hub assembly 52 in all directions. The shock absorbers 53 of inboard set A are configured in the identical arrangement to the shock absorbers 53 of outboard set B, and the above discussion of how each of the shock absorbers 53 of outboard set B extend along axis/tangent line 53A that is tangent or otherwise tangential to circle 54 that is arranged about axis X and that is coaxial with respect to circular frame 51 and hub 62 for providing tangential shock absorption by shock absorbers 53 of outboard set B along each of the axes/tangent lines 53A to allow circular frame 51 to displace radially and circumferentially relative to hub 62 and hub assembly 52 in all directions applies in every respect to the shock absorbers 53 of inboard set A of shock absorbers 53. There are six shock absorbers 53 in each of the inboard and outboard sets A and B of shock absorbers 53. The two sets A and B of shock absorbers 53 are parallel relative to each other in FIG. 5, are axially spaced-apart in FIG. 5, and are identical in every respect.

The shock absorbers 53 of the inboard set A of shock absorbers 53 in FIG. 1 are arranged in a regular cyclic hexagon or hexagonal crown that circumscribes hub 62 between circular frame 51 and hub 62. The shock absorbers 53 of the outboard set B of shock absorbers 53 in FIG. 2 are likewise arranged in a regular cyclic hexagon or hexagonal crown that circumscribes hub 62 between circular frame 51 and hub 62. Shock absorbers 53 of inboard and outboard sets A and B are connected end 70 to end 71 at the six corners of the hexagonal crown alternately to hub assembly 52 and circular frame 51 connecting hub assembly 52 to circular frame 51 and providing relative motion between circular frame 51 and hub assembly 52. The connection of ends 70 and 71 of shock absorbers 53 to hub assembly 52 and circular frame 51 alternates from one shock absorber 53 to the other. In FIG. 1, one shock absorber 53 has end 70 connected to hub assembly 52 and end 71 connected to circular frame 51, while the next adjacent shock absorber 53 in the hexagonal crown of shock absorbers 53 has end 70 connected to circular frame 51 and end 71 connected to hub assembly 52, and so on to the last of the six shock absorbers 53 of the hexagonal crown.

Shock absorbers 53 are pivotally connected to hub assembly 52 and to circular frame 51. Shock absorbers 53 are pivotally connected to spokes 60 of hub assembly 52 and are pivotally connected to lugs 65 of circular frame 51. This connects hub assembly 52, and thus hub 62, to circular frame 51 for providing relative motion between circular frame 51 and both hub 62 and hub assembly 52. As to inboard set A of shock absorbers 53 in FIG. 1, one of ends 70 and 71 of each shock absorber 53 is pivotally connected to an adjacent pair of spokes 60 of one of the three spoke sets near the inboard side of wheel assembly 50, and the other one of ends 70 and 71 of each shock absorber 53 is pivotally connected to an adjacent pair of lugs 65 of one of the three lug sets near the inboard side of wheel assembly 50. Specifically, the shock absorbers 53 of the inboard set A of shock absorbers 53 are pivotally connected end 70 to end 71 at the six corners of the hexagonal crown alternately to the outer ends 61 of the adjacent pair of spokes 60 of each of the three spoke sets near the inboard side of wheel assembly 50 with pivot pins 80, and to the adjacent pair of lugs 65 of each of the three lug sets near the inboard side of wheel assembly 50 with pivot pins 81. This alternating pivotal connection of shock absorbers 53 of set A of shock absorbers 53 to spokes 60 and lugs 65 connects hub assembly 52, and thus hub 62, to circular frame 51. While one shock absorber 53 has end 70 pivotally connected via pivot pin 80 to the outer ends 61 of an adjacent pair of spokes 60 of one spoke set and end 71 pivotally connected via pivot pin 81 to the adjacent pair of lugs 65 of an adjacent lug set, the next adjacent shock absorber 53 in the hexagonal crown has end 70 pivotally connected via pivot pin 81 to such adjacent pair of lugs 65 of such lug set and end 71 pivotally connected via pivot pin 80 to the outer ends 61 of the next adjacent pair of spokes 60 of the next adjacent spoke set, and so on to the last of the six shock absorbers 53 of the hexagonal crown. Although ends 70 and 71 of adjacent shock absorbers 53 are concurrently pivotally connected end 70 to end 71 to outer ends 61 of an adjacent pair of spokes 60 with pivot pins 80, and the ends 70 and 71 of adjacent shock absorbers are concurrently pivotally connected end 70 to end 71 to lugs 65 of an adjacent pair of lugs 65 with pivot pins 81, separate pivotal connections of the various ends 70 to outer ends 61 of arms 60 and the various ends 71 to lugs 65 can be used, which is still considered an end 70 to end 71 connection of the shock absorbers 53.

As to the outboard set B of shock absorbers in FIG. 2, shock absorbers 53 are pivotally connected to spokes 60 of hub assembly 52 and are pivotally connected lugs 65 of circular frame 51. This further connects hub assembly 52, and thus hub 62, to circular frame 51 for providing relative motion between circular frame 51 and both hub assembly 52 and hub 62. As to outboard set B of shock absorbers 53 in FIG. 2, one of ends 70 and 71 of each shock absorber 53 is pivotally connected to an adjacent pair of spokes 60 of one of the three spoke sets near the outboard side of wheel assembly 50, and the other one of ends 70 and 71 of each shock absorber 53 is pivotally connected to an adjacent pair of lugs 65 of one of the three lug sets near the outboard side of wheel assembly 50. Specifically, the shock absorbers 53 of the outboard set B of shock absorbers 53 are pivotally connected end 70 to end 71 at the six corners of the hexagonal crown alternately to the outer ends 61 of the adjacent pair of spokes 60 of each of the three spoke sets near the outboard side of wheel assembly 50 with pivot pins 80, and to the adjacent pair of lugs 65 of each of the three lug sets near the outboard side of wheel assembly 50 with pivot pins 81. This alternating pivotal connection of shock absorbers 53 of set B of shock absorbers 53 to spokes 60 and lugs 65 connects hub assembly 52, and thus hub 62, to circular frame 51. While one shock absorber 53 has end 70 pivotally connected via pivot pin 80 to the outer ends 61 of an adjacent pair of spokes 60 of one spoke set and end 71 pivotally connected via pivot pin 81 to the adjacent pair of lugs 65 of an adjacent lug set, the next adjacent shock absorber 53 in the hexagonal crown has end 70 pivotally connected via pivot pin 81 to such adjacent pair of lugs 65 of such lug set and end 71 pivotally connected via pivot pin 80 to the outer ends 61 of the next adjacent pair of spokes 60 of the next adjacent spoke set, and so on to the last of the six shock absorbers 53 of the hexagonal crown. Although ends 70 and 71 of adjacent shock absorbers 53 are concurrently pivotally connected end 70 to end 71 to outer ends 61 of an adjacent pair of spokes 60 with pivot pins 80, and the ends 70 and 71 of adjacent shock absorbers are concurrently pivotally connected end 70 to end 71 to lugs 65 of an adjacent pair of lugs 65 with pivot pins 81, separate pivotal connections of the various ends 70 to outer ends 61 of arms 60 and the various ends 71 to lugs 65 can be used, which is still considered an end 70 to end 71 connection of the shock absorbers 53.

Again, each of the shock absorbers 53 of outboard set B of shock absorbers 53 in FIG. 2 extends along tangent line 53A to circle 54 that is coaxial with respect to circular frame 51 and hub 62 for providing tangential shock absorption by shock absorbers 53 of outboard set B along each tangent line 53A. In other words, each of the shock absorbers 53 of outboard set B of shock absorbers has one end, one of ends 70 or 71, connected to hub assembly 52 and another end, the other one of ends 70 and 71, connected to circular frame 51, and each of the shock absorbers 53 extends along axis 53A from end 70 to end that is tangential to circle 54 that is coaxial with respect to the circular frame 51 and the hub 62 for providing tangential shock absorption by shock absorbers of outboard set B along each axis 53A. The shock absorbers 53 of inboard set A are identically arranged. This tangential shock absorption provided shock absorbers 53 of sets A and B connected between hub assembly 52 and circular frame 51 provides relative motion between circular frame 51 and hub assembly 52 and, again, allows circular frame 51 to displace radially and circumferentially relative to hub 62 and hub assembly 52 in all directions. Sets A and B of shock absorbers 53 work in concert connecting hub assembly 52, and thus hub 62, to circular frame 51, and providing relative motion between circular frame 51 and hub 62, and thus hub assembly 52, and allowing circular frame 51 to displace radially and circumferentially relative to hub 62 of hub assembly 52 in all directions.

Figure 6:
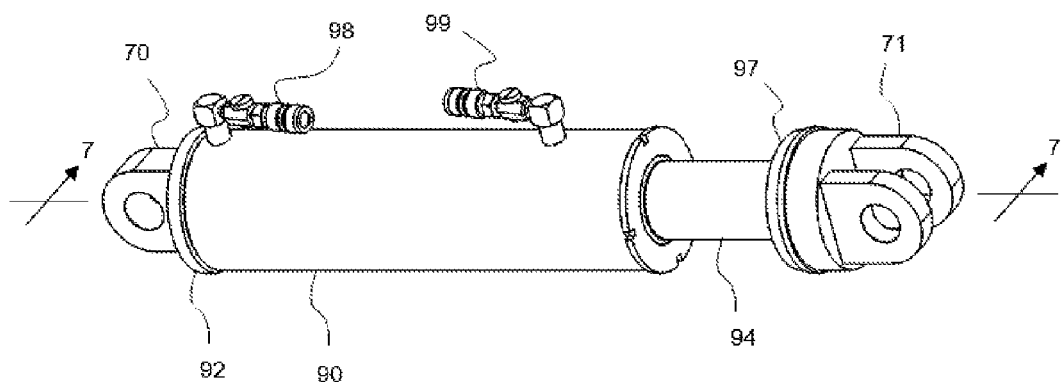
FIG. 6 is a perspective view of one of the shock absorbers of the embodiment of FIG. 1.
Figure 7:
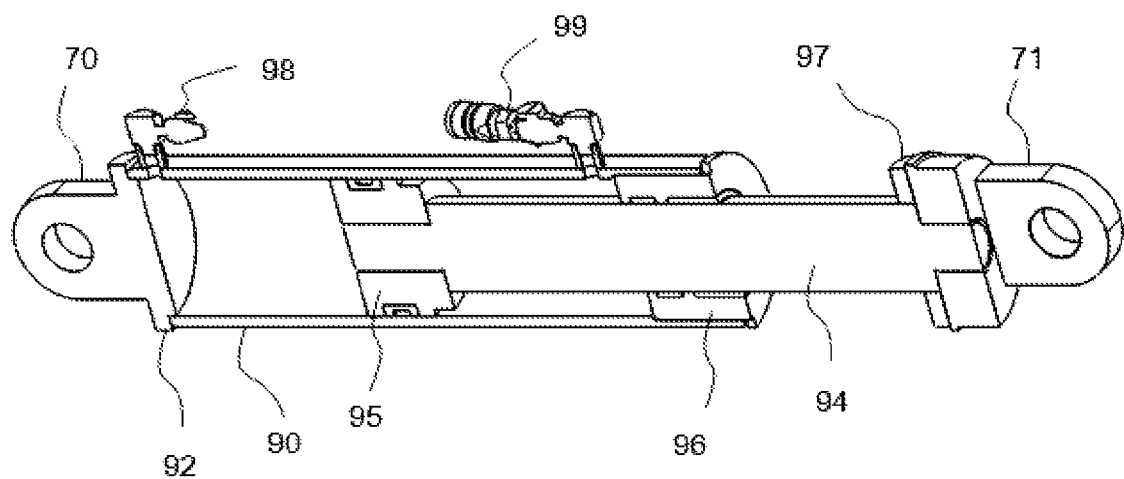
FIG. 7 is a section view taken along line 7-7 of FIG. 6.

Shock absorbers 53 are identical. Referring in relevant part to FIGS. 6 and 7, each shock absorber 53 is a piston-cylinder assembly including barrel or cylinder 90 in which a piston head 95 connected to rod 94 moves back and forth. The piston-cylinder assembly includes inner end 70, which is a pivot pin-receiving eye bar, and outer end 71, which is a pivot pin-receiving clevis. Cylinder 90 includes open end 91 and closed end 92 formed with the eye bar defining inner end 70. In each pivotal end 70 to end 71 connection described above, the pivot pin-receiving eye bar of one piston-cylinder assembly is inserted into the corresponding pivot pin-receiving clevis of the adjacent piston-cylinder assembly, both of which are pivoted about the corresponding pivot pin 80. Rod 94 has outer end 71 and piston head 95. Rod 94 is partially received piston head 95 first in cylinder 90 through open end 91. Annular seal 96 encircles rod 94 and is sealed to open end 91 of cylinder 90. A rubber bumper 97 encircles rod 94 and is situated on the underside of outer end 71. If desired, a bellow, fashioned of urethane, can be coupled between cylinder 90 and outer end 72 of rod 94 to enclose the exposed portion of piston rod 91 extending from cylinder 90, and which expands and retract in response to the reciprocal movement of rod 94 between extended and retracted positions relative to cylinder 90. Cylinder 90 is charged with pressurized gas. Opposed valves 98 and 99 in cylinder 90 are used to charge cylinder 90 with a charge of pressurized gas to produce a force in a reciprocating linear motion of rod 94. The piston-cylinder assembly in FIGS. 6 and 7 is exemplary of a well-known pneumatic piston-cylinder assembly shock absorber designed to damp shock impulse commonly used in conventional vehicle suspensions that connect a vehicle to its wheels, the details of which are well known and are not described in further detail.

As explained above, each of the shock absorbers 53 of sets A and B of shock absorbers 53 extends along axis/tangent line 53A that is tangential to circle 54 in FIG. 2 that is coaxial with respect to circular frame 51 and hub 62 for providing tangential shock absorption by the shock absorbers 53 along each of the axes/tangent lines 53A. The cylinder 90 and rod 94 of each shock absorber 53 reciprocate relative to one another along the axis/tangent line 53A for providing tangential shock absorption along such axis/tangent line 53A along which the shock absorber 53 is arranged.

Figure 3:
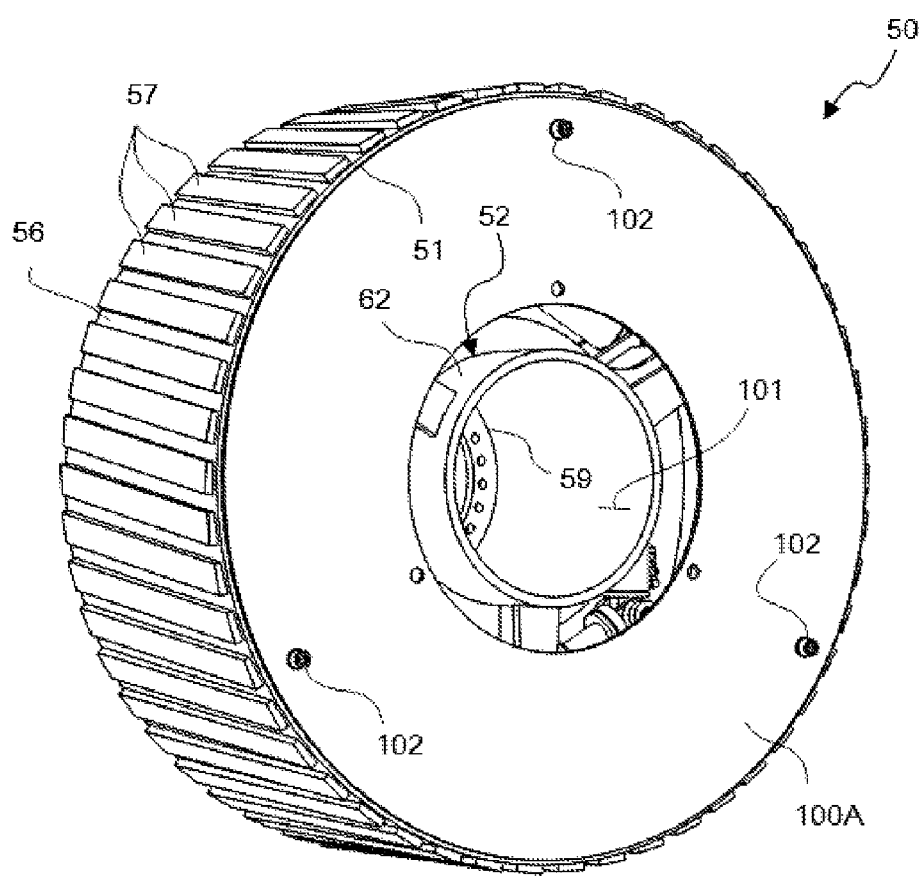
FIG. 3 is a view similar to that of FIG. 1 illustrating an inboard cover plate connected to an inboard side of the wheel assembly.
Figure 4:
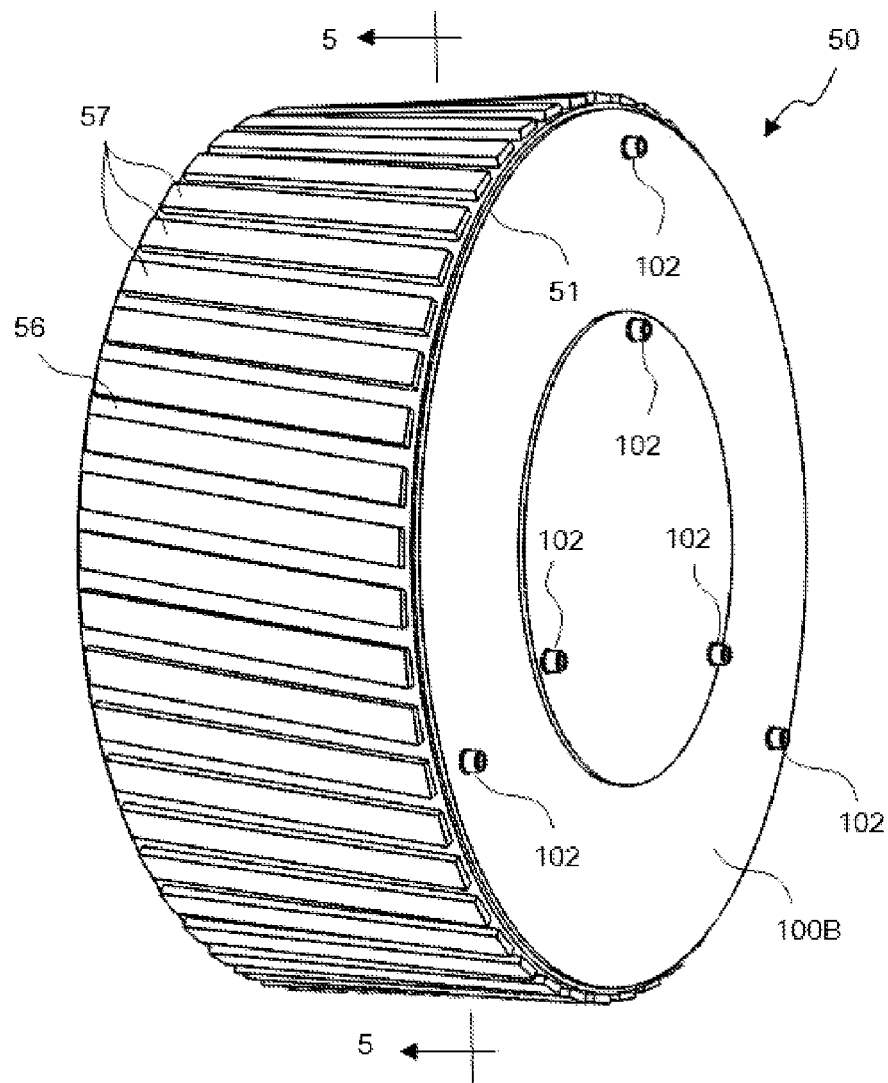
FIG. 4 is a view of an outboard cover plate connected to an outboard side of the embodiment of FIG. 3.

To prepare wheel assembly 50 for use, such as with a motorized or non-motorized vehicle, cover plates 100, fashioned of sheet metal, are affixed to the respective inboard and outboard sides of wheel assembly 50. FIG. 3 illustrates inboard cover plate 100A, having a central opening 101 to provide access to hub 62 for connecting inwardly-directed annular flange 59 of hub 62 to the rotor end of an axle of a vehicle with the customary bolts, connected to the inboard side of wheel assembly 50 with bolts 102 bolted to spacers 110 (FIG. 1), each spacer 110 being affixed via welding to the outer side of the outermost lug 65 of each of the respective three sets of lugs 65 at the inboard side of wheel assembly 50, and FIG. 3 illustrates an identical outboard cover plate 100B, connected to the outboard side of wheel assembly 50 with bolts 102 bolted to spacers 110 (FIG. 2), each spacer 110 being affixed to the outer side of the outermost lug 65 of each of the respective three sets of lugs 65 at the outboard side of wheel assembly 50. In FIG. 4, a central cover plate 104, fashioned of sheet metal, affixed to outboard cover plate 100B with bolts 102 closes the central opening (not shown) of outboard cover plate 100B. Spacers 100 are in direct contact with lugs 65 and the inner surfaces of the inboard and outboard cover plates 100A and 100B, and interact between lugs 65 and the inner surfaces of the inboard and outboard cover plates 100A and 100B laterally bracing the sets A and B of shock absorbers 53 housed in wheel assembly 50.

A wheel assembly 50 can be used for each of the wheels of a non-motorized vehicle, such as a pedal driven vehicle, or a motorized vehicle, such as a passenger vehicle, a bus, a heavy equipment vehicle, such as a dump truck, a road grater, a front loader, a military vehicle, such as a military truck, a combat vehicle, a troop carrier, etc. Wheel assembly 50 and shock absorbers 53 are sized and provided to be sufficiently strong to fit the given application. As sets A and B of shock absorbers 53 work in concert connecting hub assembly 52, and thus hub 62, to circular frame 51, while providing relative motion between circular frame 51 and hub 62, and thus hub assembly 52, and providing tangential shock absorption by shock absorbers 53 along each of the tangent lines 53A to allow circular frame 51 to displace radially and circumferentially relative to hub 62 and hub assembly 52 in all directions, the need for supplement suspension connecting the vehicle to its wheels is optional, but can be provided if so desired. Wheel assembly 50 incorporates two axially spaced-apart, parallel sets A and B of shock absorbers 53. Alternate embodiments of wheel assemblies constructed and arranged in accordance with the principle of the invention can incorporate one set of shock absorbers 53, or more than two axially spaced-apart, parallel sets A and B of shock absorbers 53.

Figure 8:
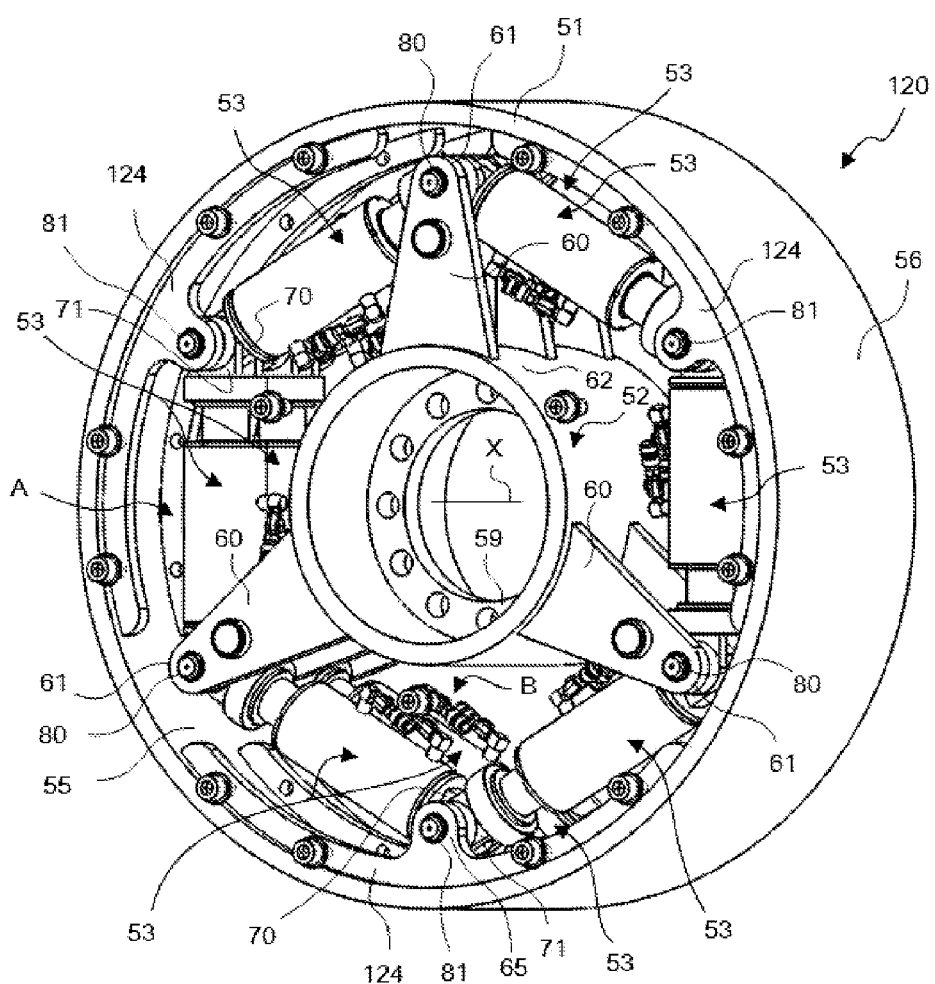
FIG. 8 is an inboard perspective view of an alternate embodiment of a wheel assembly constructed and arranged in accordance with the principle of the invention, the wheel assembly includes a circular frame arranged about a hub, and shock absorbers coupling the hub to the circular frame for providing relative motion between the circular frame and the hub.

Attention is now directed to FIG. 8, in which there is seen an inboard perspective view of an alternate embodiment of a wheel assembly 120 constructed and arranged in accordance with the principle of the invention. In common with wheel assembly 50, wheel assembly 120 shares hub assembly 52, hub 62, spokes 60, circular frame 51 arranged about hub 62, annular flange 59 of hub 62 for connection to the rotor end of an axle of a vehicle with the customary bolts, pivot pins 80 and 81, hexagonal sets A and B of shock absorbers 53 coupling spokes 60 to lugs 65 of circular frame 51 for providing relative motion between circular frame 51 and both hub 62 and hub assembly 52, circular frame 51 and hub 62 and sets A and B of shock absorbers 53 arranged about axis X of rotation of wheel assembly 120, and that each of the shock absorbers 53 extends along the axis/tangent line that is tangential to the circle that is coaxial with respect to circular frame 51 and hub 62 for providing tangential shock absorption along each of the axes/tangent lines of the shock absorbers 53.

Hub assembly 52 and shock absorbers 53 and lugs 65 are somewhat different in size and shape compared to hub assembly 52 and shock absorbers 53 and lugs 65 of wheel assembly 50. Furthermore, in wheel assembly 120 there are three sets of three axially spaced-apart spokes 60, and three sets of three axially-spaced apart lugs 65. The three ends 61 of each set of corresponding three spokes 60 are juxtaposed alongside the three lugs 65 of each set of corresponding lugs 65. In set A of shock absorbers 53 inner and outer ends 70 and 71 of shock absorbers are located between the outer ends 61 of the intermediate and inboard spokes 60 of each set of spokes 60, and in set B of shock absorbers 53 inner and outer ends 70 and 71 of shock absorbers are located between the outer ends 61 of the intermediate and outboard spokes 60 of each set of spokes 60, all being pivotally connected via pivot pin 80. In set A of shock absorbers 53 the opposed inner and outer ends 70 and 71 of shock absorbers are located between the intermediate and inboard lugs 65 of each set of lugs 65, and in set B of shock absorbers 53 the opposed inner and outer ends 70 and 71 of shock absorbers 53 are located between the intermediate and outboard lugs 65 of each set of lugs, all being pivotally connected via pivot pin 81. Beyond these differences, wheel assembly 120 is identical to wheel assembly 50, and the discussion of wheel assembly 50 in this regard applies in every respect to wheel assembly 120.

Figure 9:
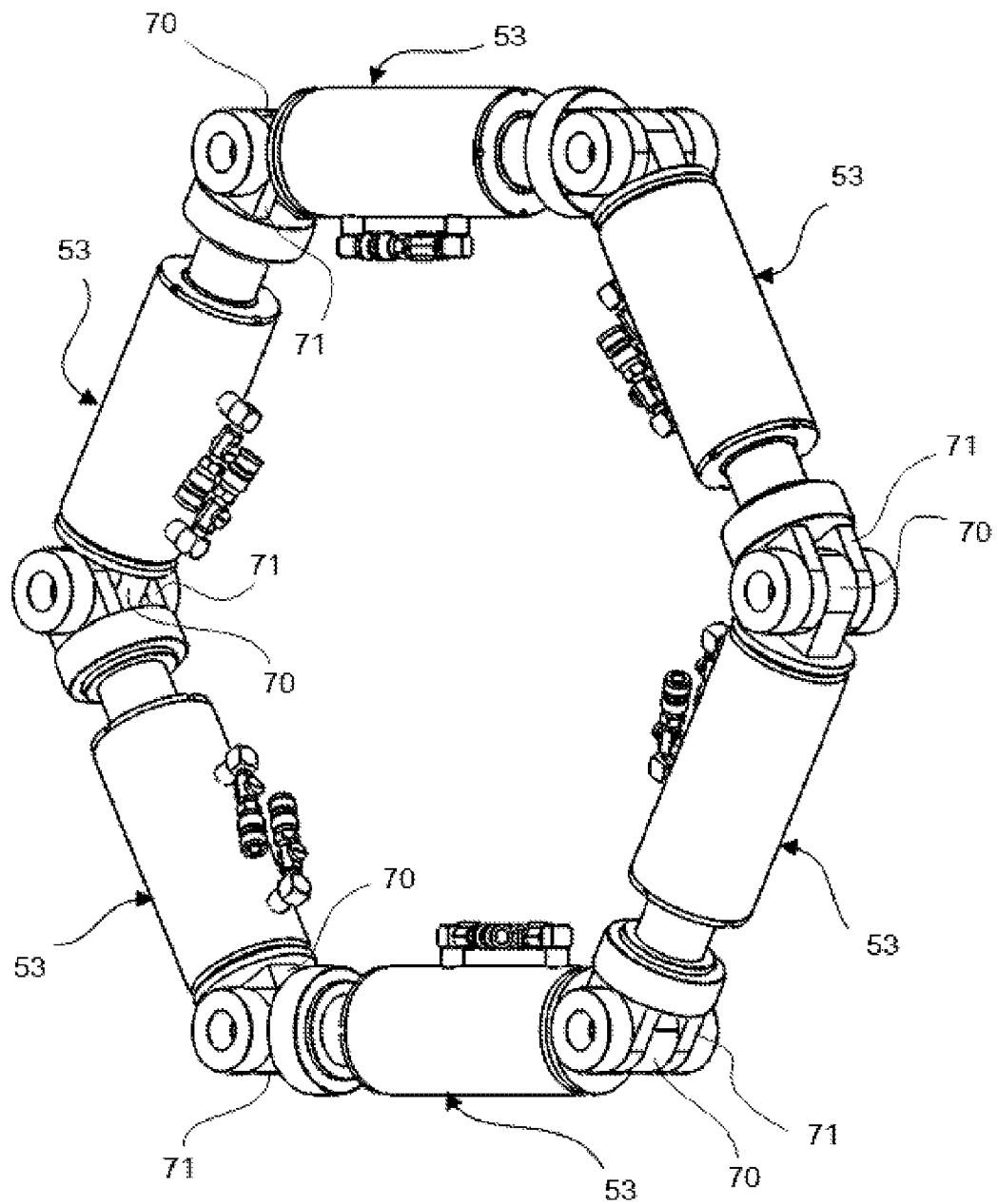
FIG. 9 is a perspective view of a set of shock absorbers of the embodiment of FIG. 8.

As a matter of illustration and reference, FIG. 9 is a perspective view of set A of shock absorbers 53 of the embodiment of FIG. 8, showing the hexagonal crown arrangement of the end 70 to end 71 coupling of shock absorbers 53, the arrangement of set B of shock absorbers 53 in wheel assembly 120 being the same as that of set A of shock absorbers 53. In wheel assembly 50 each axially-aligned pair of shock absorbers 53 of the respective sets A and B of shock absorbers 53 are aligned end 70 to end 71, whereas in wheel assembly 120 each axially-aligned pair of shock absorbers 53 of the respective sets A and B of shock absorbers 53 are aligned end 70 to end 70, and end 71 to end 71.

Figure 10:
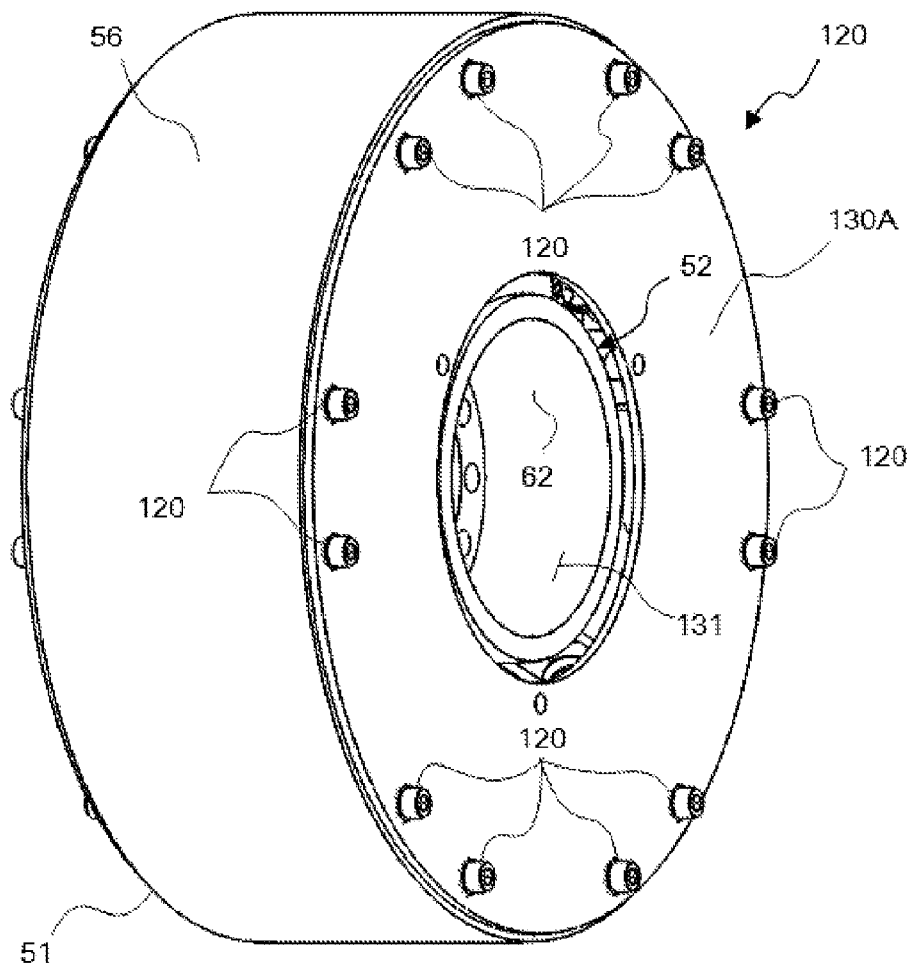
FIG. 10 is a perspective view illustrating an inboard cover plate connected to an inboard side of the wheel assembly of FIG. 8.
Figure 11:
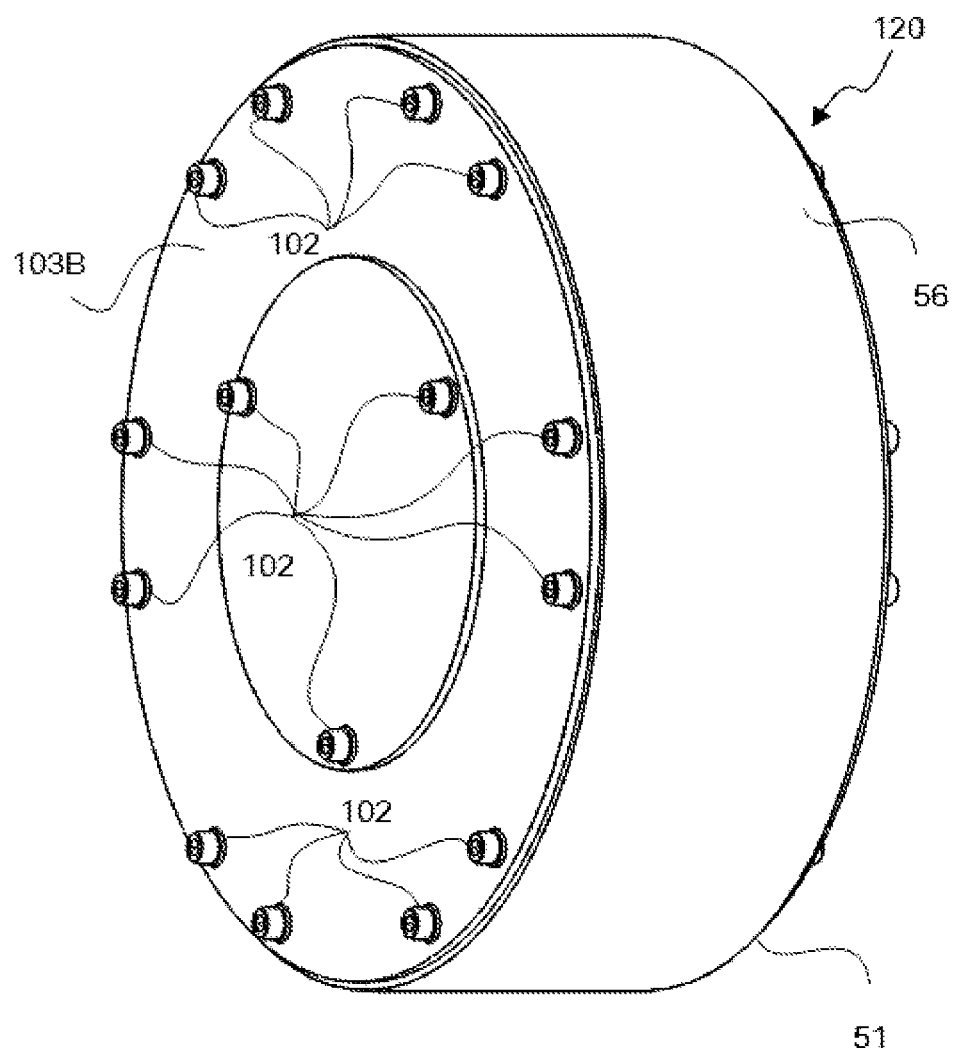
FIG. 11 is a view of an outboard cover plate connected to an outboard side of the embodiment of FIG. 10.

In FIG. 8, lugs 65 are formed in flanges 124 affixed to circular inner surface 55 of circular frame 51. To prepare wheel assembly 120 for use, such as with a motorized or non-motorized vehicle, cover plates 130, fashioned of sheet metal, are affixed to the respective inboard and outboard sides of wheel assembly 120. FIG. 10 illustrates inboard cover plate 130A, having a central opening 131 to provide access to hub 62 for connecting hub 62 to the rotor end of an axle of a vehicle, connected to the inboard side of wheel assembly 120 with bolts 102 bolted to flanges 124 (FIG. 8) at the inboard side of wheel assembly 120, and FIG. 11 illustrates an identical outboard cover plate 130B, connected to the outboard side of wheel assembly 120 in precisely the same manner, namely, with bolts 102 bolted to flanges 124 (not shown) at the outboard side of wheel assembly 120. In FIG. 11, a central cover plate 134, fashioned of sheet metal, affixed to outboard cover plate 130B with bolts 102 closes the central opening (not shown) of outboard cover plate 130B.

As in wheel assembly 50, wheel assembly 120 can be used for each of the wheels of a non-motorized vehicle or a motorized vehicle. As sets A and B of shock absorbers 53 work in concert connecting hub assembly 52, and thus hub 62, to circular frame 51, and providing relative motion between circular frame 51 and hub 62, and thus hub assembly 52, and allowing circular frame 51 to displace radially and circumferentially relative to hub 62 and hub assembly 52 in all directions, the need for supplement suspension connecting the vehicle to its wheels is optional, but can be provided if so desired. There is no exterior tread 57 on circular outer surface 56 of circular frame 51 of wheel assembly 120, but a tread can be provided if so desired. As discuss in connection with wheel assembly 50, an inflatable or solid tire can be attached to circular frame 51 of wheel assembly 120 in lieu of a tread applied directly to circular outer surface 56.

Figure 12:
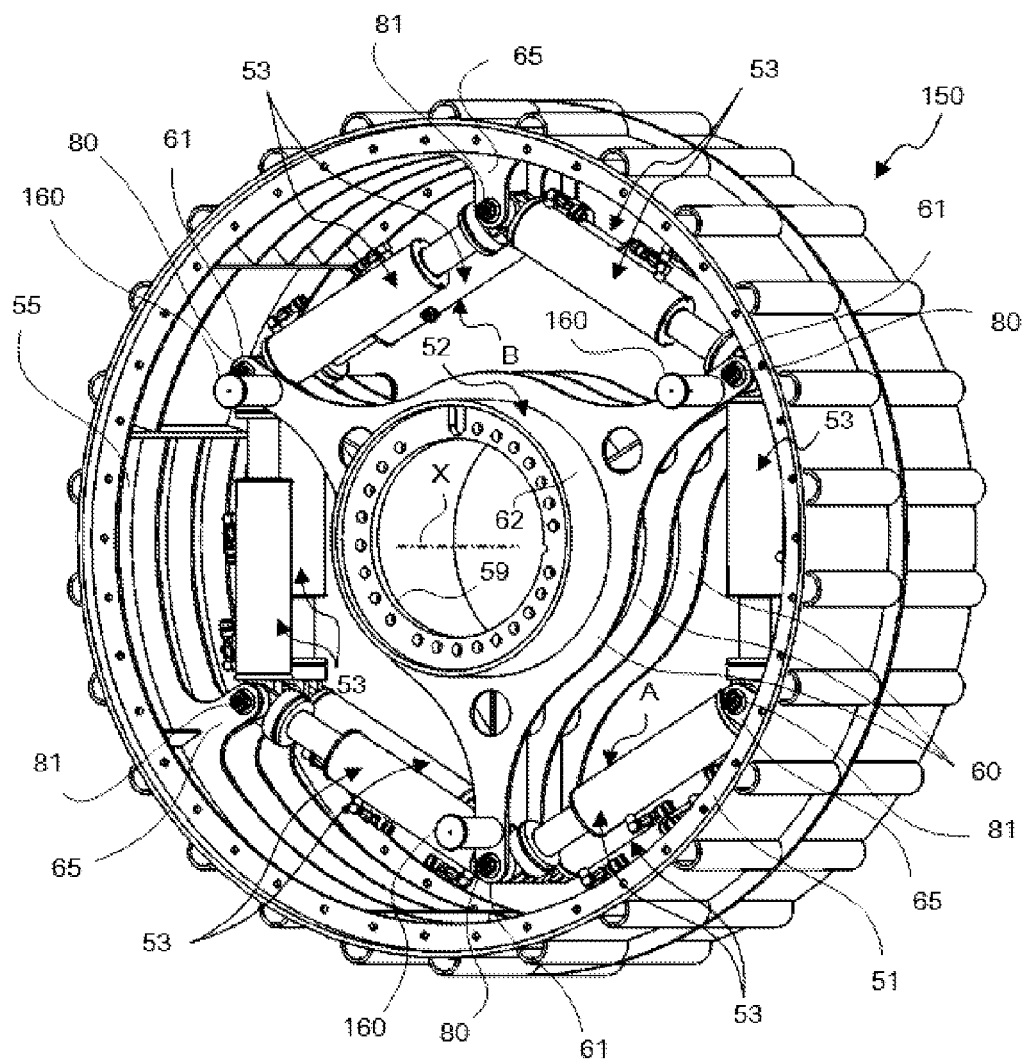
FIG. 12 is an inboard perspective view of another alternate embodiment of a wheel assembly constructed and arranged in accordance with the principle of the invention, the wheel assembly includes a circular frame arranged about a hub, and shock absorbers coupling spokes radiating from a hub to the circular frame for providing relative motion between the circular frame and the hub, and a spacer extending laterally outward from each of the spokes.
Figure 13:
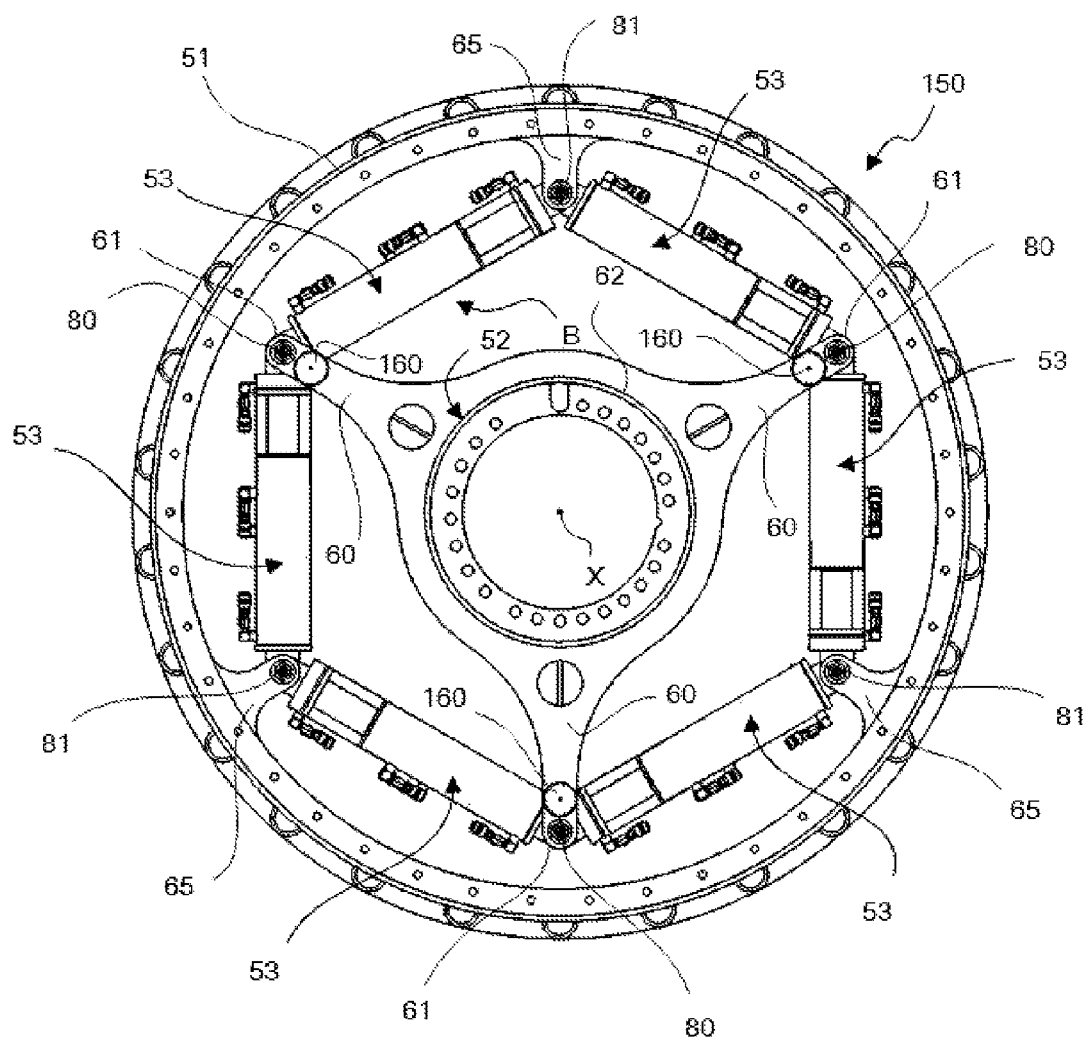
FIG. 13 is an outboard side elevation view of the embodiment of FIG. 12.

Attention is next directed to FIGS. 12 and 13, in which there is seen an inboard perspective view and an outboard side elevation view, respectively, of a further embodiment of a wheel assembly 150 constructed and arranged in accordance with the principle of the invention. Referring to FIGS. 12 and 13 in relevant part, in common with wheel assembly 50 wheel assembly 150 shares hub assembly 52, hub 62, spokes 60, circular frame 51 arranged about hub 62, annular flange 59 of hub 62 for connection to the rotor end of an axle of a vehicle with the customary bolts, pivot pins 80 and 81, hexagonal sets A and B of shock absorbers 53 coupling spokes 60 to lugs 65 of circular frame 51 for providing relative motion between circular frame 51 and both hub 62 and hub assembly 52, circular frame 51 and hub 62 and sets A and B of shock absorbers 53 arranged about axis X of rotation of wheel assembly 120, and that each of the shock absorbers 53 extends along the axis/tangent line that is tangential to the circle that is coaxial with respect to circular frame 51 and hub 62 for providing tangential shock absorption along each of the axes/tangent lines of the shock absorbers 53. Hub assembly 52 is somewhat different in shape compared to hub assembly 52 of wheel assembly 50. Furthermore, in wheel assembly 150, as in wheel assembly 120, there are three sets of three axially spaced-apart spokes 60, and three sets of three axially-spaced apart lugs 65. In set A of shock absorbers 53 inner and outer ends 70 and 71 of shock absorbers 53 in set A are located between the outer ends 61 of the intermediate and inboard spokes 60 of each set of spokes 60, and inner and outer ends 70 and 71 of shock absorbers 53 of set B are located between the outer ends 61 of the intermediate and outboard spokes 60 of each set of spokes 60, all being pivotally connected via pivot pin 80. In set A of shock absorbers 53 the opposed inner and outer ends 70 and 71 of shock absorbers 53 are located between the intermediate and inboard lugs 65 of each set of lugs 65, and in set B of shock absorbers 53 the opposed inner and outer ends 70 and 71 of shock absorbers 53 are located between the intermediate and outboard lugs 65 of each set of lugs, all being pivotally connected via pivot pin 81. Beyond these differences, wheel assembly 150 is identical to wheel assembly 50, and the discussion of wheel assembly 50 in this regard applies in every respect to wheel assembly 150.

Figure 14:
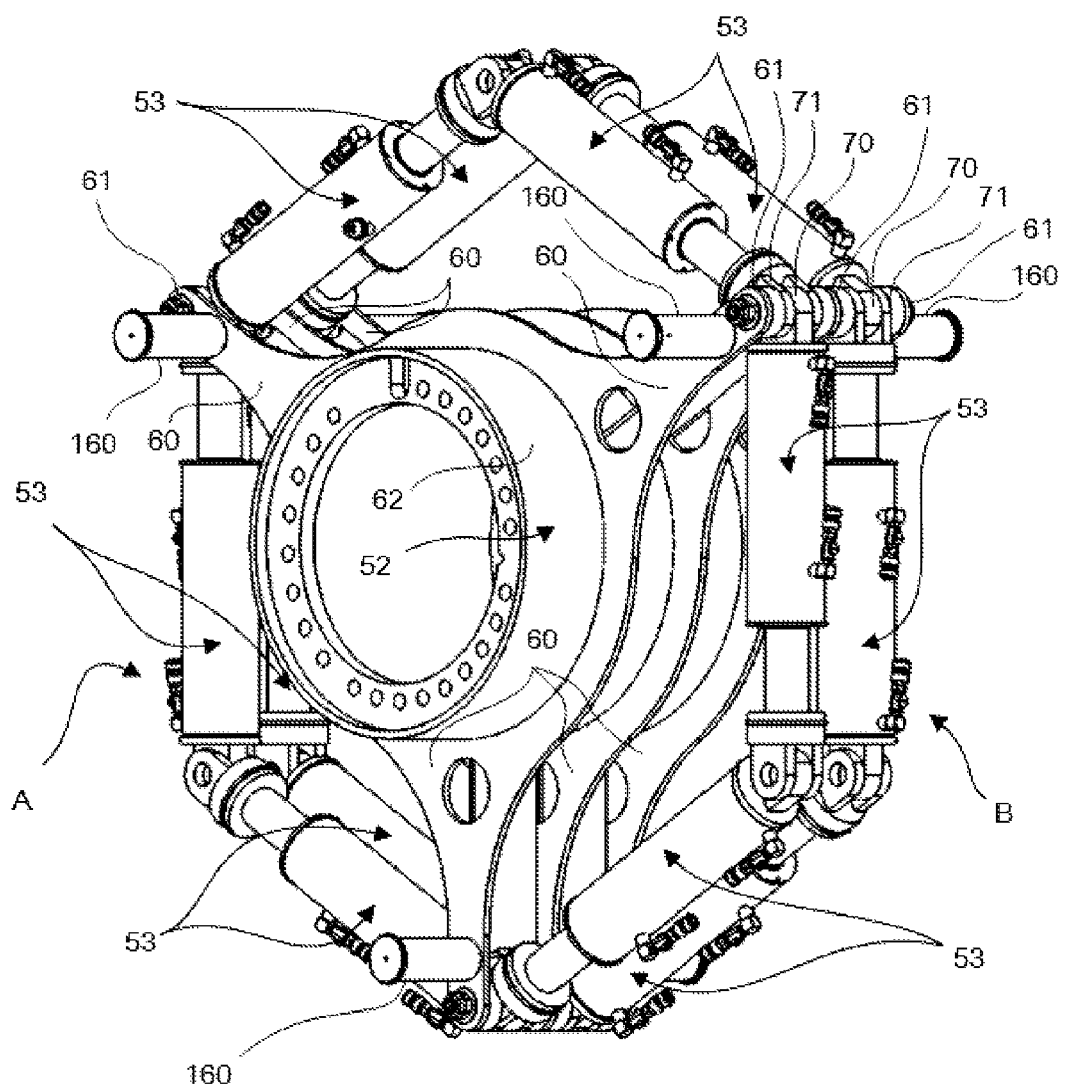
FIG. 14 is a perspective view illustrating the shock absorbers connected to the spokes radiating from the hub, all of the embodiment of FIG. 12.

As a matter of illustration and reference, FIG. 14 is a perspective view illustrating the sets A and B of shock absorbers 53 connected to the spokes 60 radiating from hub 62 of hub assembly 52 of wheel assembly 120 of FIGS. 12 and 13, showing the hexagonal crown arrangement of the end 70 to end 71 coupling of shock absorbers 53. In wheel assembly 150 each axially-aligned pair of shock absorbers 53 of the respective sets A and B of shock absorbers 53 are aligned end 70 to end 71, like that of wheel assembly 50.

Figure 15:
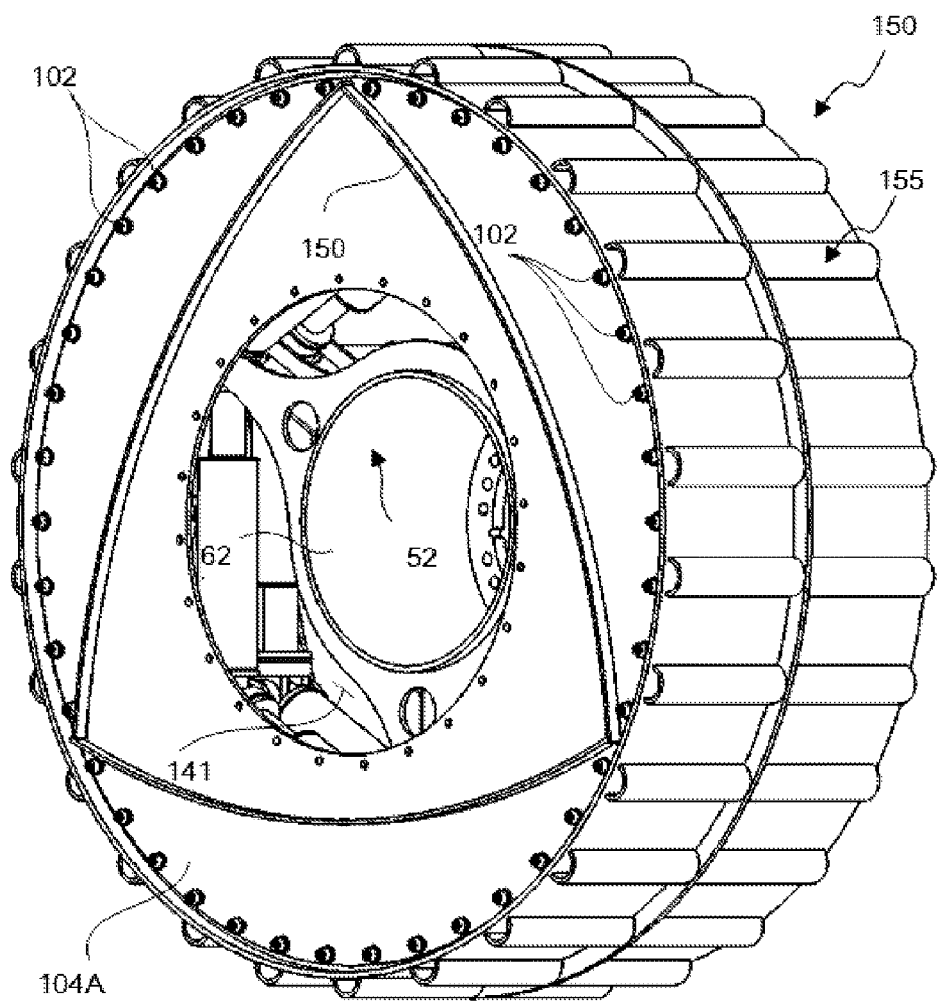
FIG. 15 is an inboard perspective view illustrating an inboard cover plate connected to an inboard side of the wheel assembly of FIG. 12.
Figure 16:
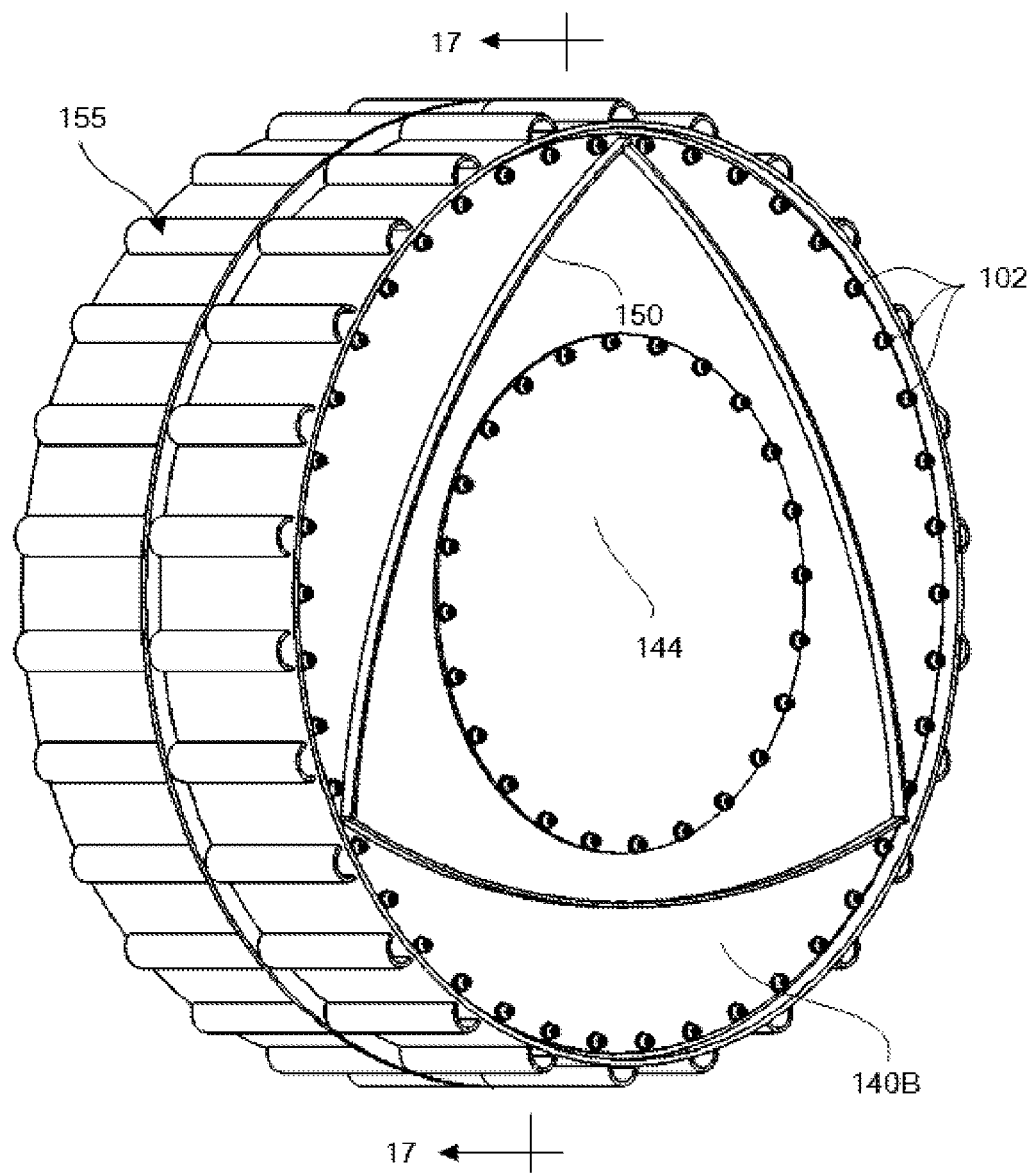
FIG. 16 is an outboard perspective view of the embodiment of FIG. 12 illustrating an outboard cover plate assembly connected to an outboard side of the wheel assembly.

To prepare wheel assembly 150 for use, such as with a motorized or a non-motorized vehicle, cover plates 140, fashioned of sheet metal, are affixed to the respective inboard and outboard sides of wheel assembly 150. FIG. 15 illustrates inboard cover plate 140A, having a central opening 141 to provide access to hub 62 for connecting hub 62 to the rotor end of an axle of a vehicle, connected to the inboard side of wheel assembly 150 with bolts 102 bolted to the inboard edge of circular frame 51 at the inboard side of wheel assembly 150, and FIG. 16 illustrates an identical outboard cover plate 140B, connected to the outboard side of wheel assembly 150 in precisely the same manner, namely, with bolts 102 bolted to the outboard edge of circular frame 51 at the outboard side of wheel assembly 150. In FIG. 16, a central cover plate 144, fashioned of sheet metal, affixed to outboard cover plate 140B with bolts 102 closes the central opening (not shown) of outboard cover plate 140B. In FIGS. 15 and 16, the outer surfaces of the respective cover plates 140A and 140B are formed with a continuous rib 150 that imparts structural rigidity to the respective cover plates 140A and 140B. Continuous ribs 150 are affixed to the outer surfaces of the respective cover plates 140A and 140B via welding. If cover plates 140A and 140B are formed by forging or stamping, continuous ribs 150 can be formed during this forging or stamping process.

As in wheel assembly 50, wheel assembly 150 can be used for each of the wheels of a non-motorized vehicle or a motorized vehicle, such as a passenger vehicle, a bus, or a heavy equipment vehicle, such as a dump truck, a road grater, a front loader, etc. As sets A and B of shock absorbers 53 work in concert connecting hub assembly 52, and thus hub 62, to circular frame 51, and providing relative motion between circular frame 51 and hub 62, and thus hub assembly 52, and allowing circular frame 51 to displace radially and circumferentially relative to hub 62 and hub assembly 52 in all directions, the need for supplement suspension connecting the vehicle to its wheels is optional, but can be provided if so desired.

In FIGS. 12, 13, and 15-17, circular outer surface 56 of circular frame 51 is formed with exterior tread 155. Exterior tread 155 is fashioned of hardened rubber, ceramic, steel, or other selected material or combination of materials. Tread 155 is rigidly affixed to circular outer surface 56, such as by adhesive, welding, or mechanical fasteners. In this example, exterior tread 155 consists of parallel tread strips formed on either side of a central rib circumscribed about circular outer surface 56. Other tread arrangements can be used. In an alternate embodiment, an inflatable or solid tire can be attached to circular frame 51 in lieu of tread 155.

Figure 17:
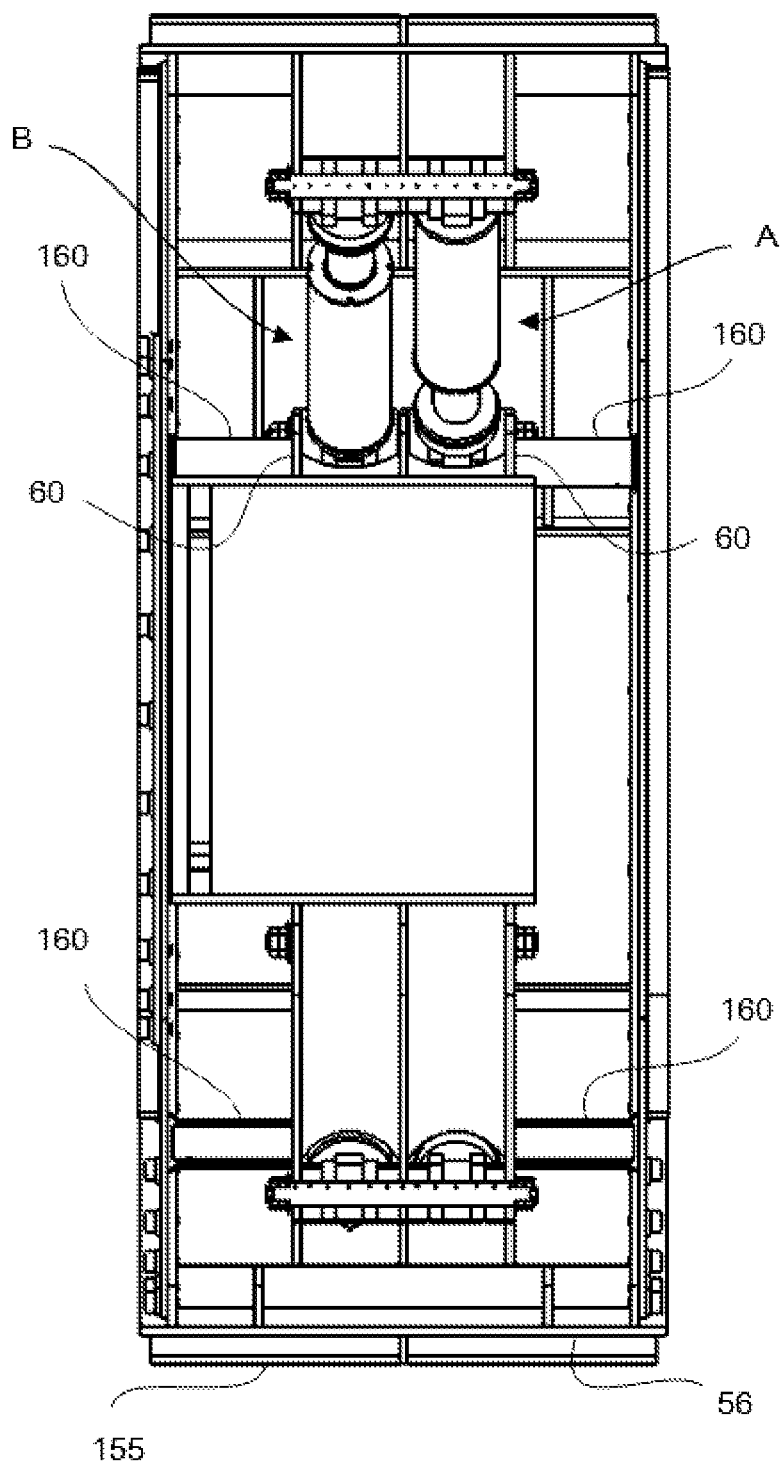
FIG. 17 is a section view taken along line 17-17 of FIG. 16.

In FIG. 12 there is a spacer 160 affixed via welding to the outer side of the outermost spoke 60 of each of the three sets of spokes 60 at the inboard side of wheel assembly 150, and in FIG. 13 there is a spacer 160 affixed via welding to the outer side of the outermost spoke 65 of each of the three sets of spokes 60 at the outboard side of wheel assembly 150. In FIG. 17, spacers 160 are in direct contact with such spokes 60 and the inner surfaces of the inboard and outboard cover plates 140A and 140B, and interact between such spokes 60 and the inner surfaces of the inboard and outboard cover plates 140A and 140B laterally bracing the sets A of shock absorbers 53 housed in wheel assembly 50.

Figure 18:
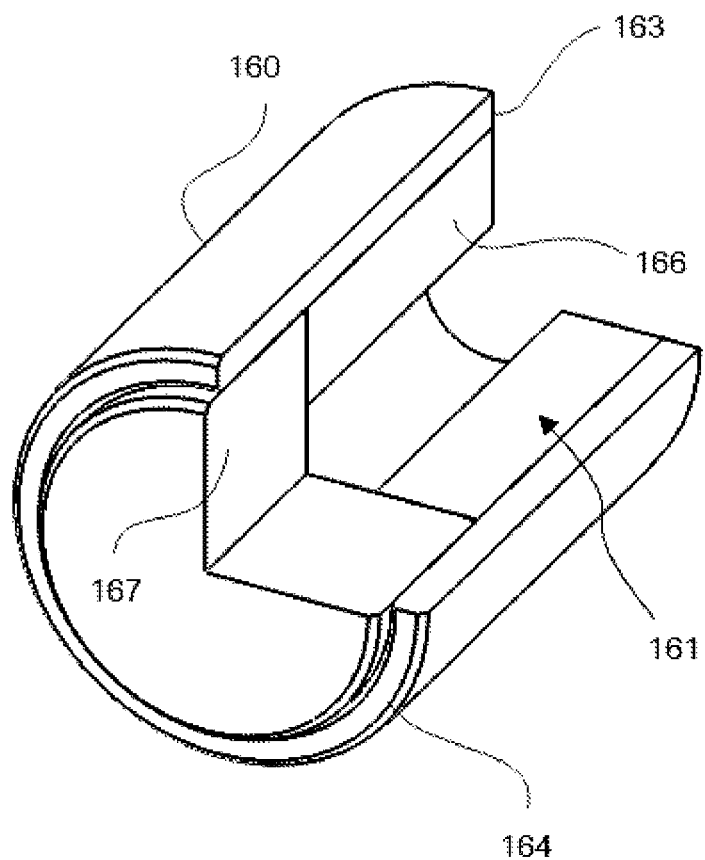
FIG. 18 is a perspective view of one of the spacers of the embodiment of FIG. 14, the view being partly broken away to better illustrate the components thereof.

Spacers 160 are identical. FIG. 18 is a perspective view of one spacer 160, the view being partly broken away to better illustrate the components thereof. Spacer 160 consists of core 161 encased in a hollow cylindrical casing 162. Cylindrical casing 162 has an inner end 163, which is to be welded to the outer side of the chosen lug 65, and an opposed outer end 164. Core 161 extends from inner end 163 to outer end 164, and includes a hollow cylindrical part 166 and a solid plug 167 that extend into casing 162 from inner end and outer end 163 and 164, respectively, to where they meet in direct contact with each other at an intermediate location relative to inner and outer ends 163 and 164 of casing 162. Cylindrical part 166 is fashioned of rubber, such as polyurethane rubber, and plug 167 is fashioned non-stick material, such as polytetrafluoroethylene, which is a solid polymer that is considered to be one of the world's most slippery substances. Cylindrical part 166 contacts the outer surface of the lug 65 to which inner end 163 of casing 162 is affixed, and plug 167 contacts the inner surface of the corresponding one of cover plates 140A and 140B. The core 161 is a dampener. In the application of spacers 160 between spokes 60 and the inner surfaces of the inboard and outboard cover plates 140A and 140B, the core 161 of each spacer 160 dampens rattling between spacers 160 and the inner surfaces of the respective cover plates 140A and 140B.

The invention has been described above with reference to illustrative embodiments. However, those skilled in the art will recognize that changes and modifications can be made to the embodiments without departing from the nature and scope of the invention. For instance, any of the wheel assemblies disclosed herein can be the core for an inflated tire. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A wheel assembly, comprising:
   a circular frame arranged about a hub of a hub assembly; and
   shock absorbers, the shock absorbers are arranged in a crown that circumscribes the hub, the shock absorbers are pivotally connected end-to-end at corners of the crown alternately to the hub assembly and to the circular frame coupling the hub assembly to the circular frame for providing relative motion between the circular frame and the hub assembly, each of the shock absorbers extends along a tangent line to a circle that is coaxial with respect to the circular frame and the hub for providing tangential shock absorption along each said tangent line.

2. The wheel assembly according to claim 1, wherein each of the shock absorbers is a piston-cylinder assembly.

3. The wheel assembly according to claim 1, wherein the hub assembly includes spokes radiating from the hub toward the circular frame to outer ends positioned inwardly and spaced-apart from the circular frame, and wherein the shock absorbers are pivotally connected end-to-end at the corners of the crown alternately to the outer ends of the spokes of the hub assembly and to the circular frame.

4. A wheel assembly, comprising:
   a circular frame arranged about a hub of a hub assembly; and
   shock absorbers between the circular frame and the hub assembly, the shock absorbers are disposed circumferentially about the hub, the shock absorbers are pivotally connected end-to-end alternately to the hub assembly and to the circular frame, each of the shock absorbers extends along an axis that is tangential to a circle that is coaxial with respect to the circular frame and the hub for providing tangential shock absorption along each said axis.

5. The wheel assembly according to claim 4, wherein each of the shock absorbers is a piston-cylinder assembly.

6. The wheel assembly according to claim 4, wherein the hub assembly includes spokes radiating from the hub toward the circular frame to outer ends positioned inwardly and spaced-apart from the circular frame, and the shock absorbers are pivotally connected end-to-end alternately to the outer ends of the spokes and to the circular frame.

7. A wheel assembly, comprising:
a circular frame arranged about a hub of a hub assembly;
parallel sets of shock absorbers coupling the hub assembly to the circular frame for providing relative motion between the circular frame and the hub assembly; and
the shock absorbers of each of the parallel sets of shock absorbers are arranged in a crown that circumscribes the hub, and are pivotally connected end-to-end at corners of the crown alternately to the hub assembly and to the circular frame coupling the hub assembly to the circular frame for providing relative motion between the circular frame and the hub assembly; and
each of the shock absorbers extends along a tangent line to a circle that is coaxial with respect to the circular frame and the hub for providing tangential shock absorption along each said tangent line.

8. The wheel assembly according to claim 7, wherein each of the shock absorbers is a piston-cylinder assembly.

9. The wheel assembly according to claim 8, wherein the hub assembly includes spokes radiating from the hub toward the circular frame to outer ends positioned inwardly and spaced-apart from the circular frame, and wherein the shock absorbers are pivotally connected end-to-end at the corners of the crown alternately to the outer ends of the spokes of the hub assembly and to the circular frame.

10. A wheel assembly, comprising:
a circular frame arranged about a hub of a hub assembly; and
parallel sets of shock absorbers between the circular frame and the hub assembly, the shock absorbers of each one of the parallel sets of shock absorbers are disposed circumferentially about the hub, and are pivotally connected end-to-end alternately to the hub assembly and to the circular frame, each of the shock absorbers extends along an axis from the first end to the second end and that is tangential to a circle that is coaxial with respect to the circular frame and the hub for providing tangential shock absorption along each said axis.

11. The wheel assembly according to claim 10, wherein each of the shock absorbers is a piston-cylinder assembly.

12. The wheel assembly according to claim 10, wherein the hub assembly includes spokes radiating from the hub toward the circular frame to outer ends positioned inwardly and spaced-apart from the circular frame, and the shock absorbers are pivotally connected end-to-end alternately to the outer ends of the spokes and to the circular frame.

\* \* \* \* \*